United States Patent [19]

Amend et al.

[11] Patent Number: 5,567,931
[45] Date of Patent: Oct. 22, 1996

[54] VARIABLE BEAM DETECTION USING A DYNAMIC DETECTION THRESHOLD

[75] Inventors: Brian J. Amend, Old Lyme; Michael Garfinkel, West Hartford, both of Conn.

[73] Assignee: Otis Elevator Company, Farmington, Conn.

[21] Appl. No.: 329,025

[22] Filed: Oct. 25, 1994

[51] Int. Cl.$^6$ ..................................................... G01V 9/04
[52] U.S. Cl. ........................ 250/221; 250/214 B; 340/556
[58] Field of Search ................................ 250/221, 222.1, 250/222.2, 214 B; 356/373, 375; 340/556, 557, 555

[56] References Cited

U.S. PATENT DOCUMENTS

| | | | |
|---|---|---|---|
| Re. 30,719 | 8/1981 | Mills | 187/52 |
| Re. 33,668 | 8/1991 | Gray | 250/221 |
| 3,746,863 | 7/1973 | Pronovost | 250/221 |
| 3,805,061 | 4/1974 | De Misimy et al. | 250/221 |
| 3,805,064 | 4/1974 | Kornylak | 250/221 |
| 3,825,745 | 7/1974 | Thomson | 250/221 |
| 3,970,846 | 7/1976 | Schofield et al. | 250/221 |
| 4,063,085 | 12/1977 | Montanvert | 250/221 |
| 4,247,767 | 1/1981 | O'Brien et al. | 250/221 |
| 4,266,124 | 5/1981 | Weber et al. | 250/221 |
| 4,750,591 | 6/1988 | Coste et al. | 187/391 |
| 4,794,248 | 12/1988 | Gray | 250/221 |
| 4,818,866 | 4/1989 | Weber | 250/221 |
| 5,149,921 | 9/1992 | Picado | 187/130 |
| 5,243,183 | 9/1993 | Barron, Jr. et al. | 250/221 |
| 5,247,139 | 9/1993 | Schon et al. | 187/104 |
| 5,286,967 | 2/1994 | Bates | 250/221 |

FOREIGN PATENT DOCUMENTS

| | | |
|---|---|---|
| 0232866 | 2/1987 | European Pat. Off. . |
| 0544541 | 11/1992 | European Pat. Off. . |
| WO9008092 | 1/1990 | WIPO . |
| WO8202787 | 8/1992 | WIPO . |

*Primary Examiner*—Que T. Le

[57] ABSTRACT

An apparatus for detecting obstructions includes a plurality of emitters for radiating beams of energy, a plurality of detectors for providing detector signals in response to the beams of energy radiated by the plurality of emitters and a controller for determining if the beams of energy are obstructed by analyzing the detector signals and implementing a dynamic detection threshold. The controller generates an average beam strength and current beam strength from which said controller means determines if an obstruction is present by determining if the current beam strength is within a predetermined range of the average beam strength.

13 Claims, 6 Drawing Sheets

VARIABLE BEAM DETECTION USING A DYNAMIC DETECTION THRESHOLD

BACKGROUND OF THE INVENTION

1. Technical Field

The present invention relates to detectors in elevators and, more particularly, to the detection of obstructions in an elevator car doorway.

2. Background Art

In elevators, it is common to use one or more automatic sliding doors. Systems are used to detect the presence of an obstruction within the door opening before and during closure for the protection of the passengers. If the system detects an obstruction, the elevator doors are prevented from closing further and preferably are reopened.

One known system for detecting obstructions in the path of elevator doors places light beams in a path across the door opening and uses a sensor to detect an interruption of the light beams, which occurs if an obstruction is disposed within the door opening. Upon sensing the interruption, the sensor issues a signal to alter the motion of the doors, and preferably reopen them.

The system has an array of light emitters disposed vertically on one side of the door, producing light beams, and a corresponding array of photo-sensitive detectors arranged on the other door, for sensing those light beams, thus creating a system which can sense obstructions at different heights in the doorway. The emitters and detectors are disposed on the doors such that if the doors are open then the emitters and detectors are far apart and if the doors are closed, or closing, the emitters and detectors are in close proximity.

The amplitude of the light beam is related to the distance it has to travel between the emitters and the detectors; more specifically, the farther the beams must travel, the greater the beam amplitude must be in order to achieve proper detection of the beams by the detectors. As a result, the system requires a high beam amplitude when the doors are open and far apart.

DISCLOSURE OF INVENTION

It is an object of the present invention to provide a variable beam detection apparatus and method which provides improved detection of obstructions within a defined area such as in an elevator car doorway.

It is a further object of the present invention to provide a variable beam detection apparatus and method which provides improved detection of small or translucent obstructions disposed within the door opening.

It is another object to provide a variable beam detection apparatus and method which provides improved detection of obstructions disposed within the door opening when the doors are within close proximity with respect to each other.

It is yet another object of the present invention to provide a variable beam detection apparatus which is simple in design, easily manufactured, and economically manufactured.

According to the present invention for providing variable beam detection, an apparatus for detecting obstructions in an area includes a plurality of beams of energy passing within the area and means for determining deviations in a current beam strength as compared to an average beam strength if the beams encounters an obstruction in the area.

Among the advantages of the present invention is increased sensitivity of obstructions in an elevator door, particularly when the elevator doors are close together. This increased sensitivity provides improved detection of small or translucent obstructions when the doors are in close proximity with respect to each other. The increased sensitivity also may reduce the number of incidents of elevator doors striking passengers which in turn increases customer satisfaction while decreasing maintenance costs.

BRIEF DESCRIPTION OF THE DRAWINGS

The foregoing and other objects, features and advantages of the present invention will become more apparent in light of the following detailed description and accompanying drawings where.

BEST MODE FOR CARRYING OUT THE INVENTION

Figure 1:
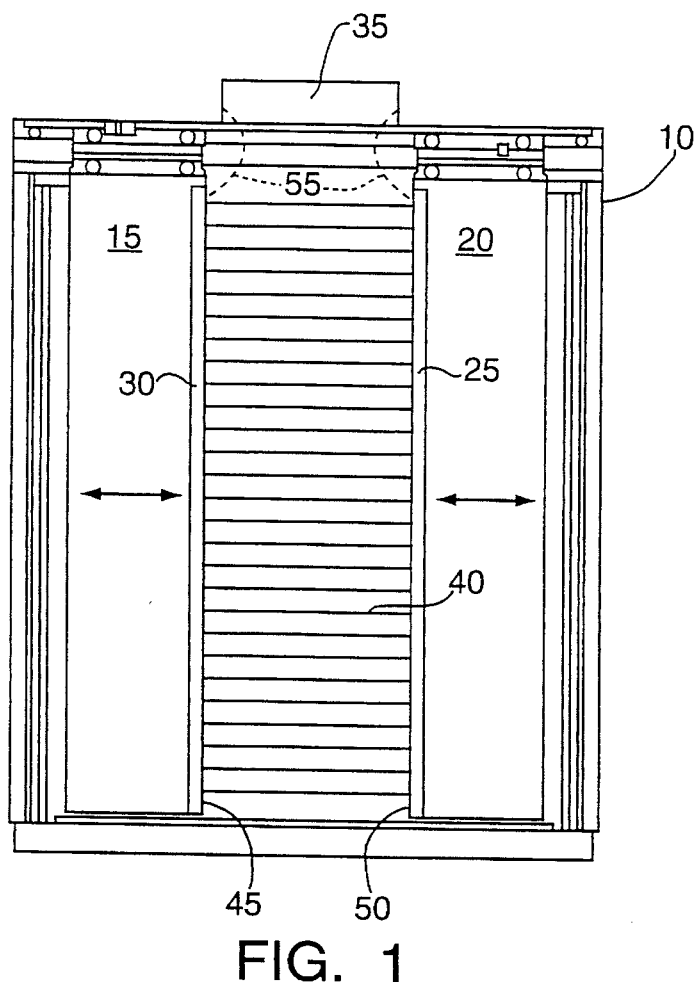
FIG. 1 is a front view of an elevator doorway employing a preferred embodiment of the present invention.

In FIG. 1, an elevator car 10, a first elevator door 15, a second elevator door 20, an emitter array 25, a detector array 30, a controller 35, and a plurality of energy beams 40 are shown. The doors 15, 20, shown in an open position, slide to open and close such that as the doors close the closure edge 45 of the door 15 touches the closure edge 50 of the door 20.

The emitter array 25 is shown disposed near the first door 20 and the detector array 30 is shown disposed near a second door 15. The controller 35 is disposed on top of the elevator car 10 and is electrically connected 55 to both the emitter array 25 and the detector array 30. The electrical connection 55 allows the controller 35 to communicate with the emitter array 25 and the detector array 30.

Figure 2:
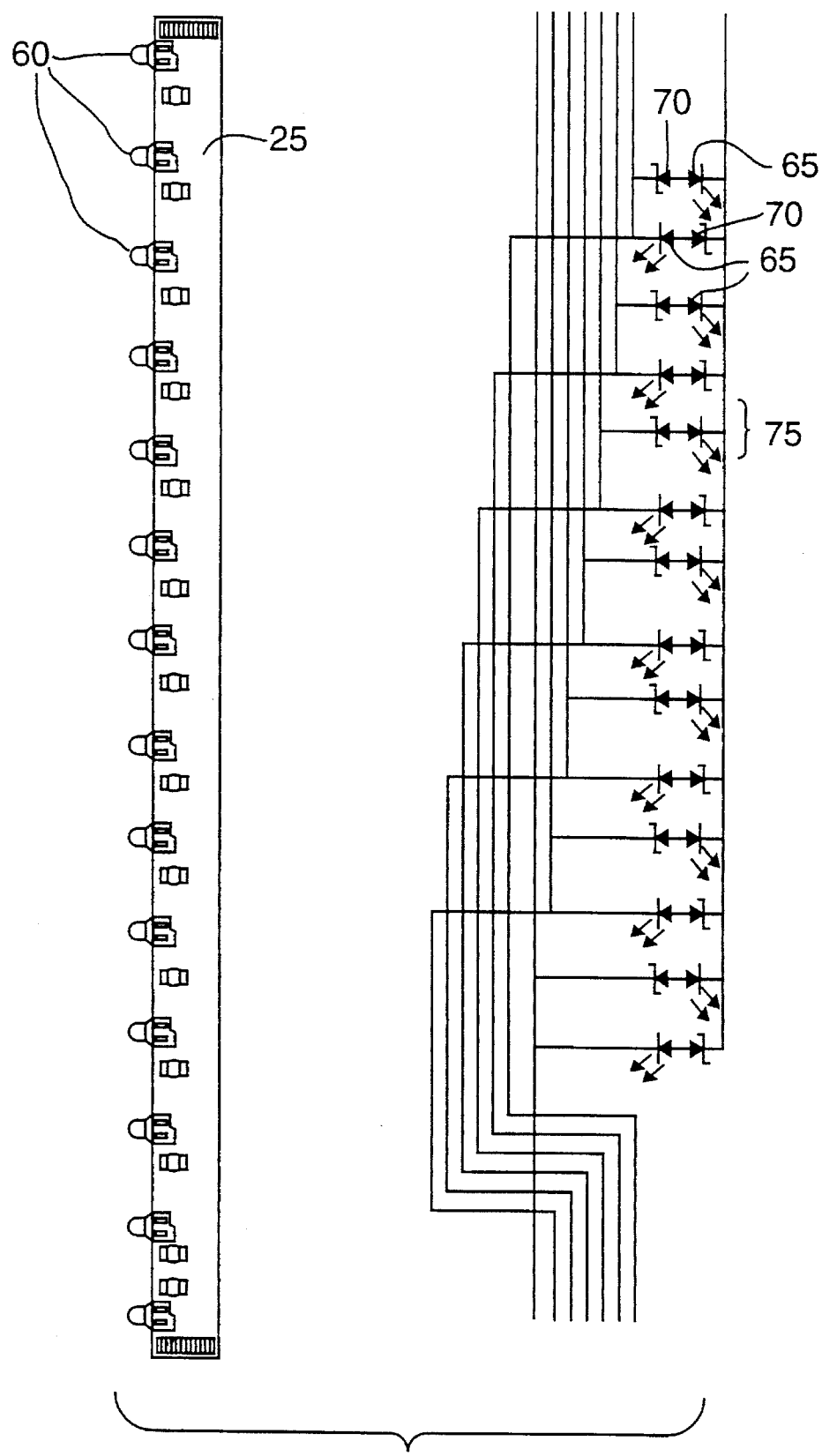
FIG. 2 shows a side view of an emitter array and shows a schematic representation of a preferred embodiment of an emitter array circuitry.

Referring to FIG. 2, the emitter array 25 includes a plurality of emitters 60. The emitters 60 are light bulbs, LED devices or any radiation emitting device; for example, an infrared emitter that is modulated so that its radiated energy is distinguishable from background radiation of the surroundings. In one preferred embodiment, as shown in FIG. 2, each emitter is a LED device 65 which is arranged in series with a zener diode 70 such that a LED/diode pair 75 is created. Each LED/diode pair 75 is electrically connected in parallel with another pair arranged with the opposite polarity such that either pair 75 may be selected, depending on the direction of current flow, using the same electrical connections. This configuration results in reduced manufacturing costs by reducing the required number of wires and connections. In one preferred embodiment, the emitter array includes fifty-six emitters 60.

Figure 3:
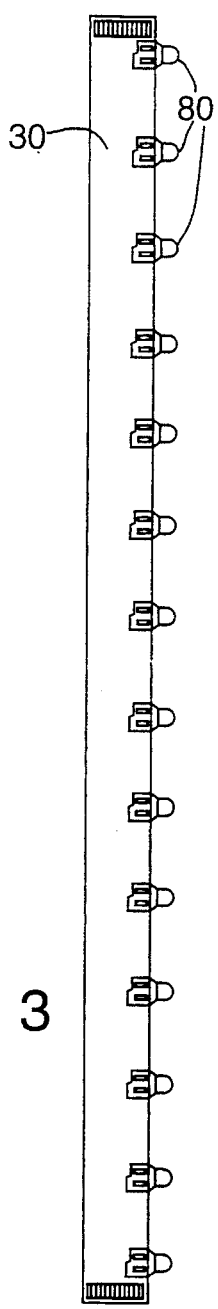
FIG. 3 shows a side view of a detector array.

Referring to FIG. 3, the detector array 30 includes a plurality of detectors 80. Each detector 80 is any device that is sensitive to the radiation of the emitters 60; yet preferably adapted to be insensitive to radiation other than that from the emitters. For example, the detectors 80 may be photodiodes or phototransistors which are designed to pass signals at the emitter modulation frequency and wavelength.

In one preferred embodiment, for each emitter 60 in the emitter array 25 there is a corresponding detector 80 in the detector array 30 so that matched pairs are formed. Each detector 80 produces a detector signal 85 (shown in FIG. 4) in response to the energy radiated by its corresponding emitter 60 in its matched pair. The detector signal 85 is an analog representation of the magnitude of the radiated energy detected by the detector 80. In this preferred embodiment, only one matched pair is actuated at any one time so that cross interference between emitters 60 is eliminated.

Figure 4:
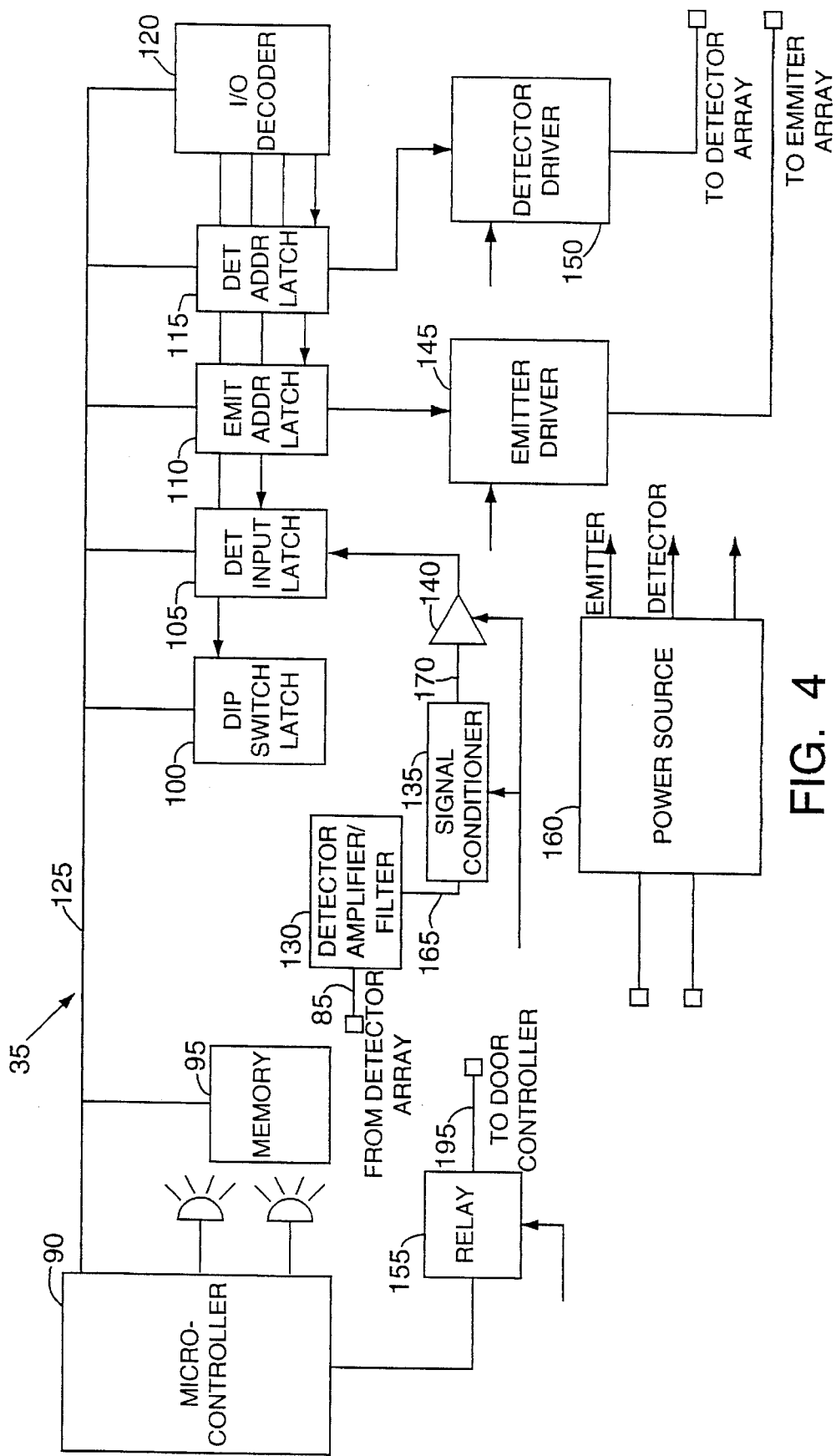
FIG. 4 is a block diagram of a preferred controller.

Referring to FIG. 4, the controller 35 includes a microcontroller 90, a memory 95, a dip switch latch 100, a der input latch 105, a emit addr latch 110, a det addr latch 115, an I/O decoder 120, an address/data bus 125, a detector amplifier/filter 130, a signal conditioner 135, an A/D converter 140, an emitter driver 145, a detector driver 150, a relay 155 and a power supply 160.

The microcontroller 90 is a device used to implement control functions and beam detection methods in the present invention as is explained hereinbelow. The memory 95 is used to store data and programs. The address/data bus 125 provides an electrical connection between the microcontroller 90 and the memory 95, the dip switch latch 100, the det input latch 105, the emit addr latch 110, the det addr latch 115 and the I/O decoder 120. A device suitable for use as the microcontroller 90 is available commercially as model 80C31 microcontroller from Intel.

The I/O decoder 120 is a device which enables the microcontroller 90 to transfer data to, and from, the latch devices 100, 105, 110, 115. For example, if the microcontroller 90 requires current data from the der input latch 105, the I/O decoder 120 polls the det input latch and retrieves the current data via the address/data bus. The I/O decoder 120 is electrically connected to the dip switch latch 100, the det input latch 105, the emit addr latch 110, the det addr latch 115 and the microcontroller 90.

The dip switch latch 100 provides a user interface such that dip switch settings can be processed by the controller 35. For example, the user may select a particular system mode by selecting a predetermined dip switch setting. The det input latch 105 provides detector data from the detector array 30 to the microcontroller 90. The emit addr latch 110 provides emitter addressing data from the microcontroller 90 to the emitter driver 145. The der addr latch 115 provides detector addressing data from the microcontroller 90 to the detector driver 150. Flip-flops or registers are suitable as latch devices as is well known in the art.

The emitter driver 145 receives emitter address data provided by the microcontroller 90 and actuates the corresponding emitter 60 in the emitter array 25. Likewise, the detector driver 150 receives detector address data provided by the microcontroller 90 and actuates the corresponding detector 80 in the detector array 30. In one preferred embodiment, both the emitter driver 145 and the detector driver 150 are implemented with multiplexers which are respectively responsive to emitter or detector address data and actuate the corresponding emitter 60 or detector 80. This type of addressing technique is well known in the art. Using this arrangement, the microcontroller 90 can actuate the matched pairs in the emitter and detector arrays 25, 30. In a preferred embodiment, the microcontroller 90 serially actuates the matched pairs in the order of their physical arrangement. However, the pairs may be activated in any desired order.

Figure 5:
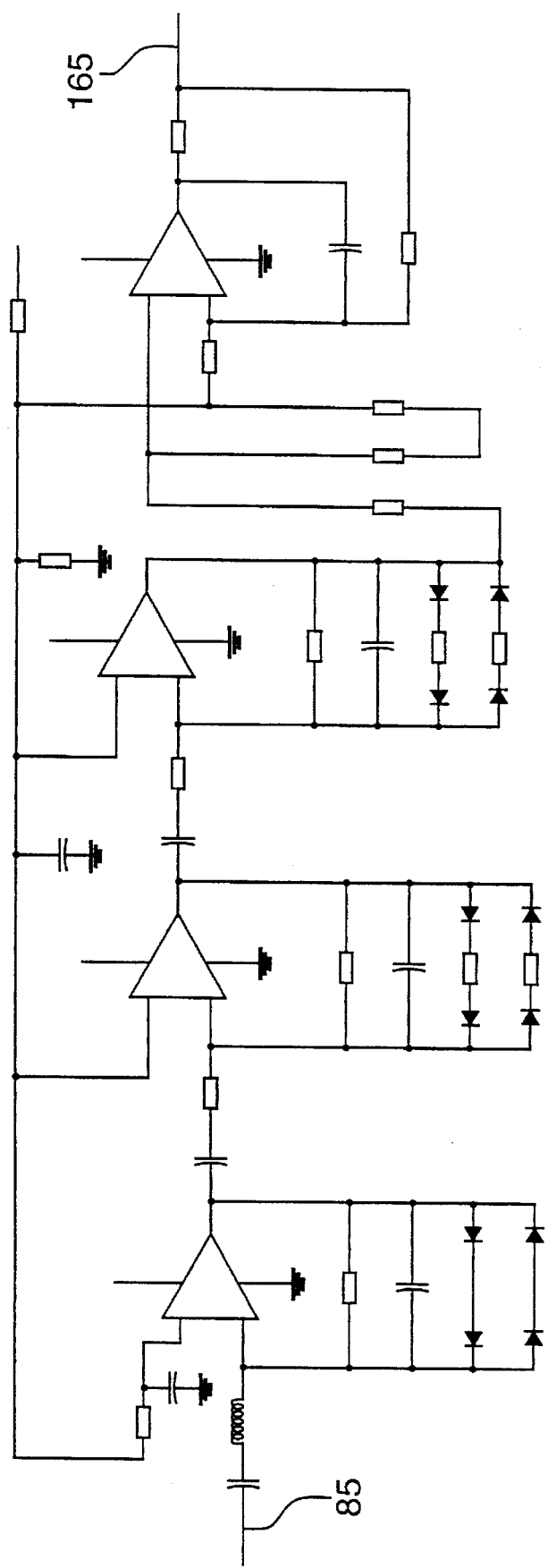
FIG. 5 is a schematic representation of a preferred embodiment of a detector amplifier/filter.

The detector amplifier/filter 130 receives, amplifies and filters the detector signal 85 from each detector 80 such that it provides an amplified/filtered detector signal 165 to the signal conditioner 135. This circuit is used to compensate for the non-linear relationship between radiant intensity and distance by providing an essentially linear response. One preferred embodiment of the detector/filter is shown in FIG. 5.

Figure 6:
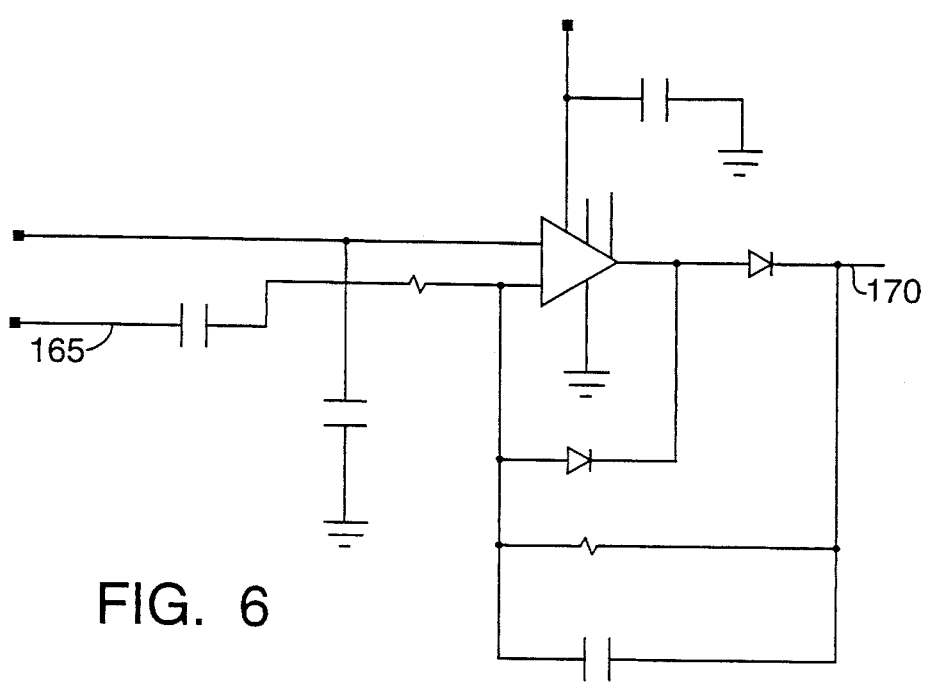
FIG. 6 is a schematic representation of a preferred embodiment of a signal conditioner.

The signal conditioner 135 is a circuit which provides the function of filtering, amplification and rectification and is responsive to the amplified/filtered detector signal 165 such that it provides a conditioned detector signal 170 to the A/D converter 140. Circuits of this type are well known in the art and one preferred embodiment is shown in FIG. 6.

Figure 7:
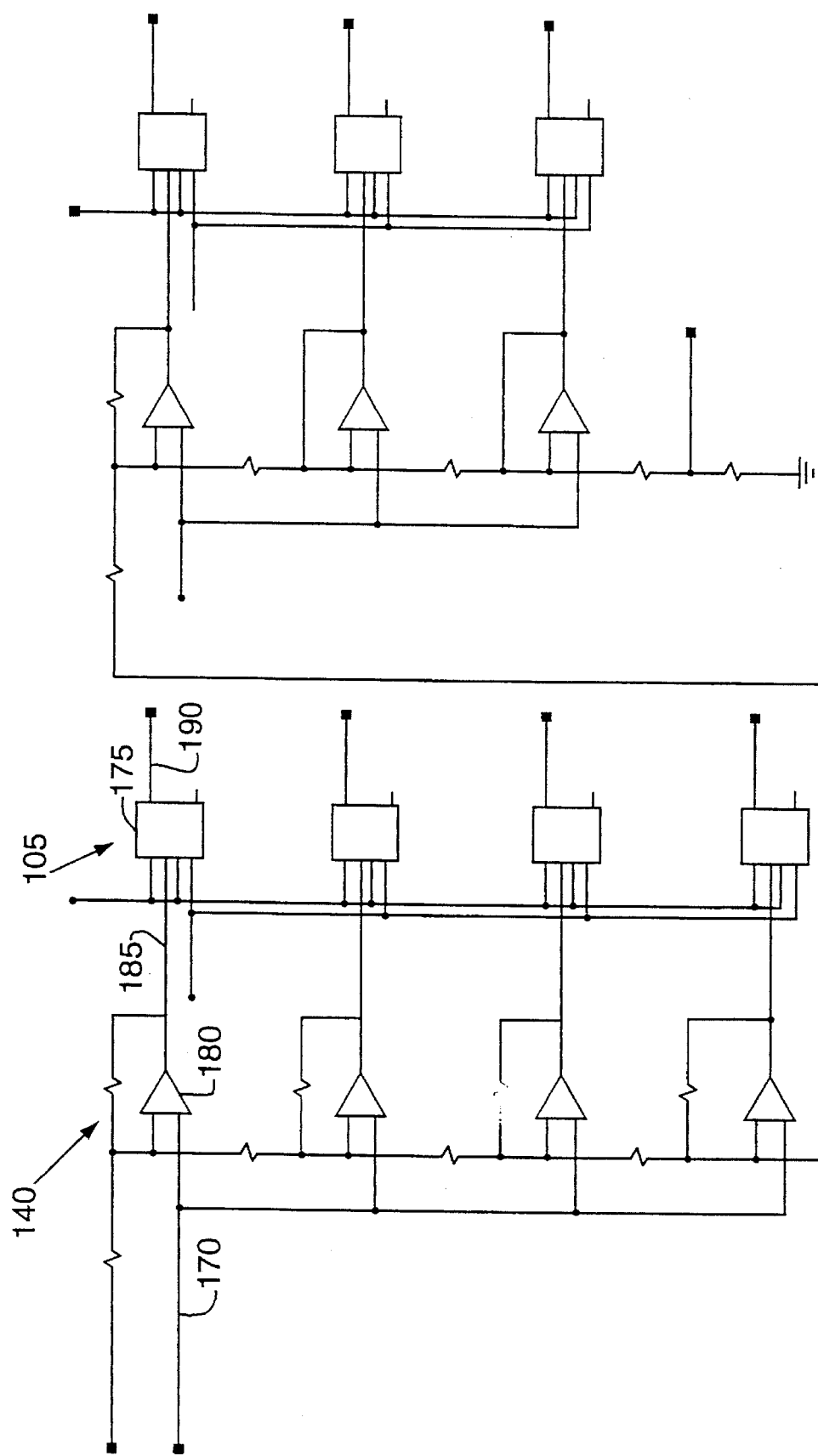
FIG. 7 is a schematic representation of a preferred embodiment of an A/D converter and shows a schematic representation of a preferred embodiment of a det input latch.

Referring to FIG. 7, a schematic diagram of a preferred embodiment of the A/D converter 140 and the det input latch 105 is shown. The det input latch 105 includes seven flip-flops 175. The A/D converter 140 includes seven comparators 180 each having as inputs the conditioned detector signal 170 and a voltage trip point. Each voltage trip point is determined by the VR (voltage reference) signal and location on a voltage divider network. Each comparator 180 respectively provides an output signal 185 which is dependent upon the conditioned detector signal 170 and the voltage trip point. The comparators 180 are connected such that if the magnitude of the conditioned detector signal 170 is greater than the voltage trip point at a particular stage of the network, the comparators 180 at that stage will produce an output signal 185 which clocks the corresponding flip-flop 175 to produce a digital detector signal 190. The microcontroller 90 stores the plurality of digital detector signals 190 in memory 95. The plurality of digital detector signals 190, for a particular emitter 60, collectively represents an integer value ranging from zero to seven and is referred to hereinafter as the digital detector value. The digital detector value of the currently actuated emitter 60 is referred to as the current beam strength ("CBS"). Thus, this circuit arrangement is used to detect the peak value of the conditioned detection signal 170 for each emitter 60 and convert it into a digital format so that the microcontroller 90 can store it in memory 95.

Referring again to FIG. 4, the relay 155 is connected to the microcontroller 90 and the door controller of the elevator system (not shown) and is used to provide a reverse door signal 195 to the door controller if an obstruction is detected.

The power supply 160 is used to supply electric power to the components of the present invention and is well known in the art.

In one preferred embodiment according to the invention, the controller 35 operates in accordance with a variable beam detection method for dynamically controlling the detection threshold of an energy beam. This method allows the present invention to provide improved detection of obstructions within a defined area such as in an elevator car doorway. The variable beam detection method resides in the memory 95 and demonstrates the cooperation of the present invention as is described hereinbelow.

Figure 8:
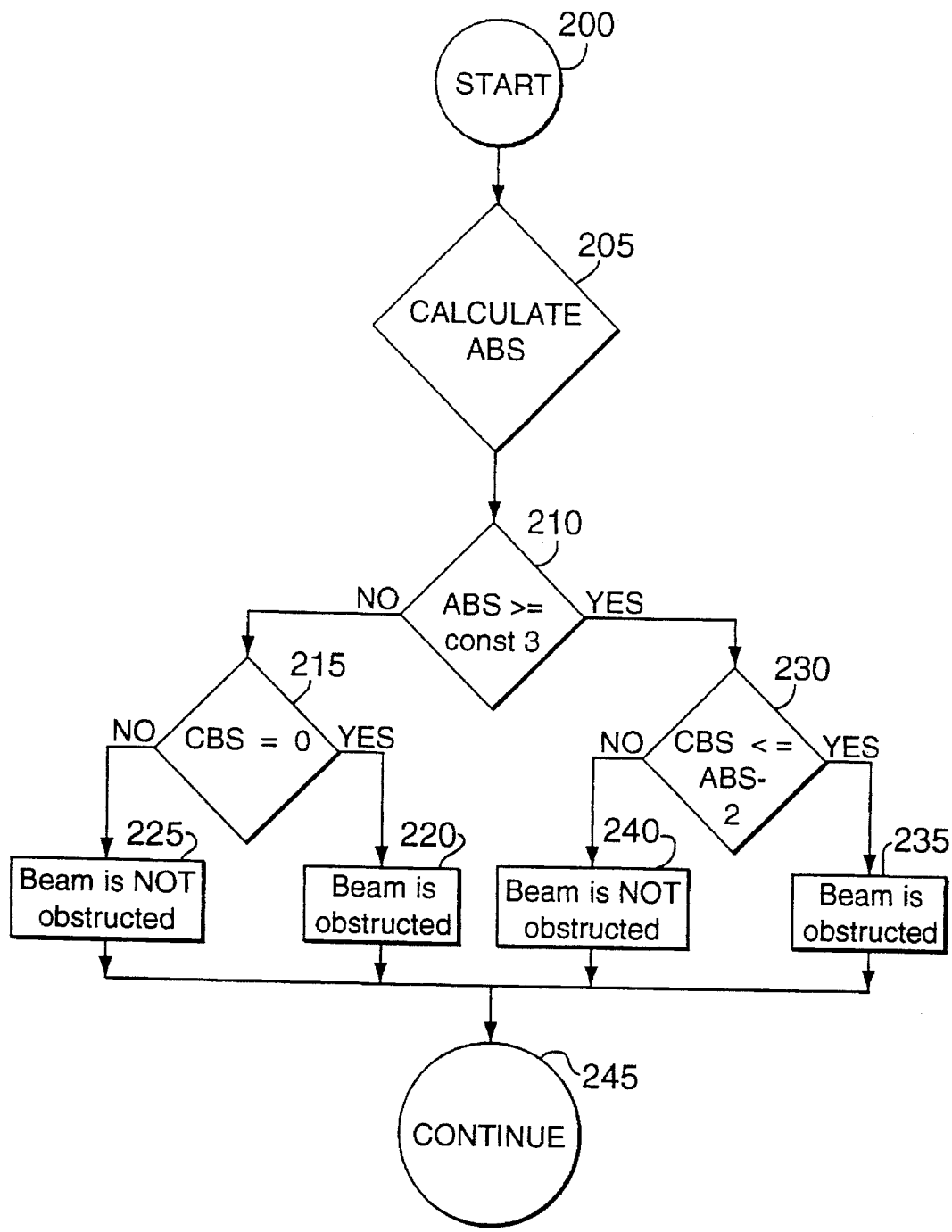
FIG. 8 is a flow diagram of a preferred method embodied in the present invention.

FIG. 8 is a flow diagram of the variable beam method embodied in the present invention. The flow diagram represents a scan of one matched pair of an emitter 60 and a detector 80. Beginning at step 200 labeled "start" the first step performed 205 is to generate the average beam strength ("ABS"). To generate the ABS, the microcontroller 90 determines a sum of the digital detector values of the non-obstructed functional beams and divides the sum by the number of non-obstructed functional beams. The ABS will vary as the doors 15, 20 travel. For example, the ABS will decrease as the distance between the doors closure edges 45, 50 increases. An ABS less than the integer value three represents a large distance between the door closure edges 45, 50 where variable beam detection is not critical since at far distances an obstruction can easily block the beam of energy.

A Step 210 is implemented for determining whether the CBS should be compared to a static or a dynamic threshold for detecting the presence of an obstruction. The static detection threshold is a predetermined value against which the CBS is compared for detecting the presence of an obstruction. The dynamic detection threshold is a variable value against which the CBS is compared for detecting the presence of an obstruction. In step 210 the microcontroller 90 compares the ABS to the integer value three. If the ABS is not greater than nor equal to the integer value three, then the present invention implements a static detection threshold of zero. The present invention implements the static detection threshold as follows. In step 215 the microcontroller 90 determines if the CBS is equal to zero. If CBS is equal to zero then the microcontroller 90 determines that the energy beam is obstructed as shown in step 220. If the CBS is not zero then the microcontroller determines that the energy beam is not obstructed as shown in step 225.

If the ABS is greater than or equal to the integer value three, then the present invention implements variable beam detection by using a dynamic detection threshold of the ABS minus the integer value two. The present invention implements the dynamic detection threshold as follows. The microcontroller 90 in step 230 determines whether the CBS is less than or equal to the ABS minus the integer value two. If the CBS is less than or equal to the ABS minus the integer value two then the microcontroller 90, in step 235, determines that the current beam is obstructed. If the CBS is not less than nor equal to the ABS minus the integer value two then the microcontroller 90, in step 240, determines that the current beam is not obstructed. The integer value of two represents a predetermined range that permits small deviations from the average beam strength to be ignored so as to avoid detecting false obstructions. Thus, the present invention determines if the CBS has deviated beyond a predetermined range of the ABS. In one preferred embodiment, the ABS is generated every 100 milliseconds whereas the CBS is generated every 35 milliseconds. Thus, a new ABS, step 205, is not generated during each scan of the matched pairs. It should be understood by those skilled in the art that the integer values used in this best mode embodiment result from one specific implementation of the present invention and other values may be chosen without departing from the spirit and scope of the invention.

Referring to FIG. 4, if the microcontroller 90 determines that the beam is obstructed then it actuates the relay 155 which is used to transmit the door reversal signal 195 to the door controller of the elevator system (not shown). This allows the elevator system to prevent the doors from closing further and, preferably, reopen the elevator doors in the event of an obstruction.

Thus, the present invention provides increased sensitivity of obstructions by implementing variable beam detection for dynamically controlling the detection threshold of an energy beam which results in improved detection of obstructions within a defined area such as in an elevator car doorway. This increased sensitivity provides improved detection of small or translucent obstructions disposed within the door opening when the doors are within close proximity with respect to each other. Consequently, the increased sensitivity may reduce the number of incidents of elevator doors striking passengers which in turn increases customer satisfaction while decreasing maintenance costs.

Although the invention has been shown and described with respect to a best mode embodiment thereof, it should be understood by those skilled in the art that various other changes, omissions and additions in the form and detail thereof may be made therein without departing from the spirit and scope of the invention.

What is claimed is:

1. A beam detection apparatus for detection of obstructions in an elevator doorway, said apparatus comprising:
   a. a plurality of emitters for radiating beams of energy, said plurality of emitters being disposed near a first elevator door;
   b. a plurality of detectors, for providing detector signals in response to the beams of energy radiated by said plurality of emitters, said plurality of detectors being disposed near a second elevator door; and
   c. means for determining if the beams of energy are obstructed by analyzing the detector signals and implementing a dynamic detection threshold.

2. A variable beam detection apparatus as recited in claim 1 wherein said controller means generates an average beam strength and a current beam strength from which said means determines if an obstruction is present by determining if the current beam strength is within a predetermined range of the average beam strength.

3. A variable beam detection apparatus as recited in claim 1 wherein the dynamic detection threshold of said means is an average beam strength minus a predetermined range.

4. A variable beam detection apparatus as recited in claim 1 wherein the beams of energy radiated by said plurality of emitters are beams of light.

5. A beam detection apparatus for detection of obstructions, said apparatus comprising:
   a. a plurality of emitters for radiating beams of energy;
   b. a plurality of detectors for providing detector signals in response to the beams of energy radiated by said plurality of emitters; and
   c. means for determining if the beams of energy are obstructed by analyzing the detector signals and implementing a dynamic detection threshold.

6. A variable beam detection apparatus as recited in claim 5 wherein said controller means generates an average beam strength and a current beam strength from which said means determines if an obstruction is present by determining if the current beam strength is within a predetermined range of the average beam strength.

7. A variable beam detection apparatus as recited in claim 5 wherein the dynamic detection threshold of said means is an average beam strength minus a predetermined range.

8. A variable beam detection apparatus as recited in claim 5 wherein the beams of energy radiated by said plurality of emitters are beams of light.

9. An apparatus for detection of obstructions in an area, said apparatus comprising:
   a. a plurality of beams of energy passing within the area; and b. means for determining deviations in a current beam strength as compared to an average beam strength if the beams encounter an obstruction in the area.

10. A variable beam detection apparatus as recited in claim 9 wherein the beams of energy radiated by said plurality of emitters are beams of light.

11. A method for variable beam detection which dynamically controls the detection threshold of an energy beam comprising the steps of:

a. emitting a plurality of beams of energy;

b. detecting the plurality of beams of energy;

c. providing detector signals in response to detecting the plurality of beams of said detecting step;

d. generating a dynamic detection threshold in response to the detector signals of said providing step;

e. determining if an obstruction is present in a beam of energy by comparing a current beam strength to the dynamic detection threshold of said generating step.

12. A method for variable beam detection as recited in claim 11 further comprising the step of generating an average beam strength in response to the detector signals of said providing step wherein the dynamic detection threshold is the average beam strength minus a predetermined range.

13. A method for variable beam detection as recited in claim 11 wherein said method is used with an elevator system for detecting obstructions in an elevator car doorway.

\* \* \* \* \*